United States Patent [19]

Burt et al.

[11] Patent Number: 4,674,340

[45] Date of Patent: Jun. 23, 1987

[54] SYSTEM FOR DETERMINING THE TORQUE REQUIRED TO LOOSEN A THREADED CAP

[75] Inventors: Daryl D. Burt, Golden; Monty E. Haskell, Westminster, both of Colo.

[73] Assignee: Adolph Coors Company, Golden, Colo.

[21] Appl. No.: 820,064

[22] Filed: Jan. 21, 1986

[51] Int. Cl.⁴ ............................................. G01L 5/00
[52] U.S. Cl. .................................. 73/862.23; 73/847
[58] Field of Search ............... 73/862.21, 862.23, 761, 73/794, 806, 847, 9

[56] References Cited

U.S. PATENT DOCUMENTS

| | | |
|---|---|---|
| 2,279,698 | 4/1942 | Weckerly . |
| 2,300,288 | 10/1942 | Hullhorst . |
| 2,337,951 | 12/1943 | Whitehead . |
| 2,552,407 | 5/1951 | Crabbe . |
| 3,122,915 | 3/1964 | Haller . |
| 3,866,463 | 2/1975 | Smith et al. . |

FOREIGN PATENT DOCUMENTS 0129717 10/1980 Japan .............................. 73/862.21

Primary Examiner—Charles A. Ruehl
Attorney, Agent, or Firm—Klaas & Law

[57] ABSTRACT

A system for use in determining the torque required to loosen a threaded cap on a container, which container is held in a fixed position while a constant downward force is being placed on the threaded cap, by applying a gradually increasing electrical force to an electric motor tending to turn the electric motor so as to apply a torque on the threaded cap and using a torque sensor to measure the torque being applied by the electric motor on the threaded cap and recording the peak torque that was applied during the complete loosening of said threaded cap.

20 Claims, 6 Drawing Figures

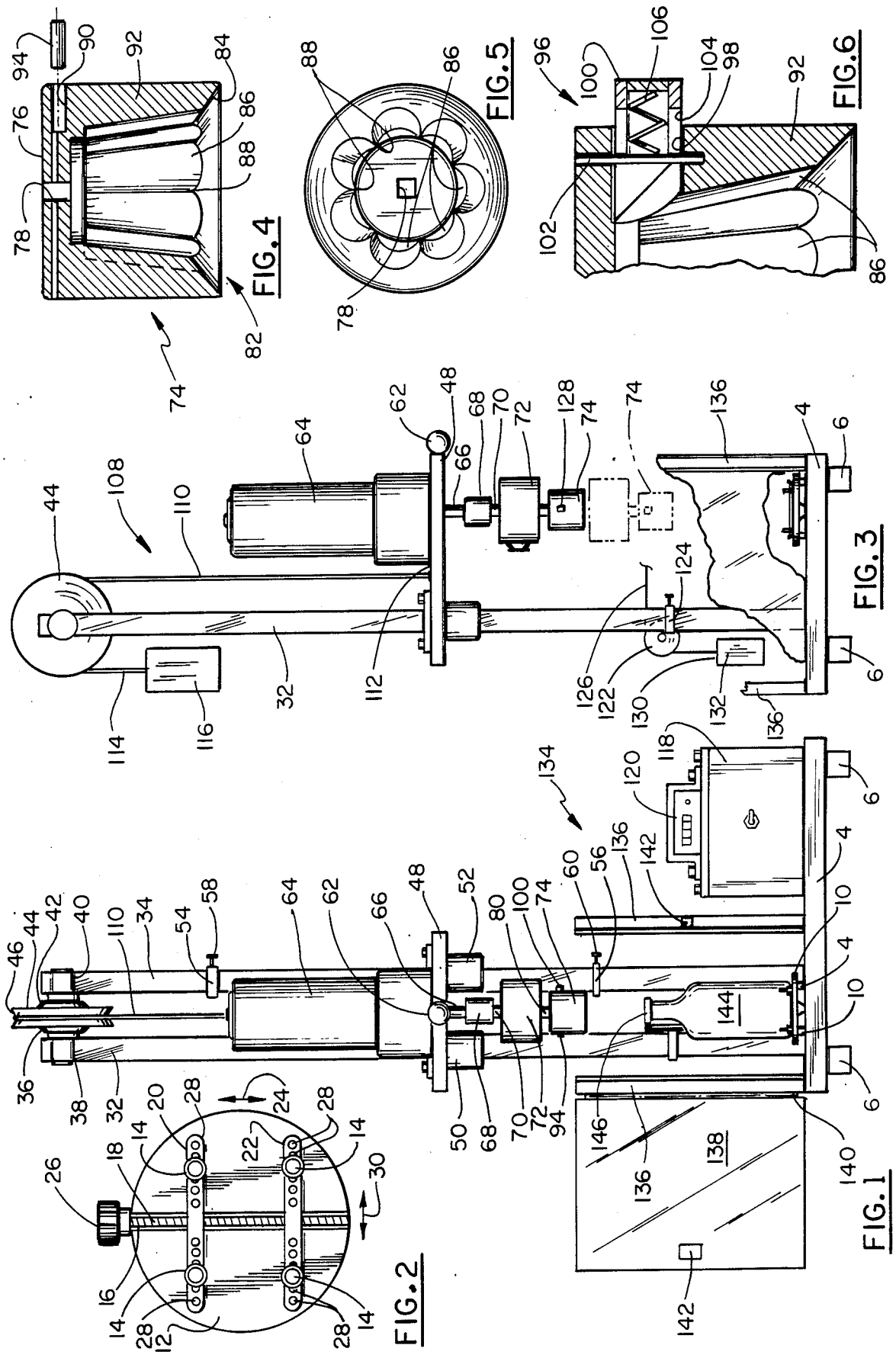

SYSTEM FOR DETERMINING THE TORQUE REQUIRED TO LOOSEN A THREADED CAP

FIELD OF THE INVENTION

This invention relates generally to the testing of the torque required to loosen a threaded cap on a container and more specifically to a system for duplicating the human effort used in loosening a threaded cap on a container.

BACKGROUND OF THE INVENTION

Many industries market products using threaded caps on containers. Therefore, it is desirable to have a system for determining the torque required to loosen a threaded cap from a container. This is desirable since the threaded caps are applied automatically and it is necessary to know that the threaded caps are being applied with sufficient force so that the contents are protected by a proper seal and also that the threaded caps may be loosened without requiring an excessive amount of force. One such system is that disclosed in U.S. Pat. No. 3,866,463 issued to Smith et al. which uses a complicated system using pressurized air, pressure gauges and rams, gears and racks to determine the torque required to loosen a threaded cap from a container. Weckerly, U.S. Pat. No. 2,279,698, discloses a rather complicated system for measuring the mechanical strength of molded container caps and in one embodiment, to determine the permissible torque which may be applied to an assembled container and cap by the filling machine. However, Weckerly does not address the problems associated with determining the torque required to loosen a threaded cap from a container. Thus, there exists a need for a relatively simple and economic system for accurately determining the torque required to loosen a threaded cap on a container.

BRIEF DESCRIPTION OF THE INVENTION

This invention provides such a system wherein an operator places a container into a holder and allows apparatus to move into contact with and place a predetermined constant force on a threaded cap on the container and to grasp the threaded cap so as to prevent relative movement therebetween. An electric motor is used to apply gradually increasing amounts of torque to the threaded cap to initiate and continue the loosening of the threaded cap. A torque sensor connected to the electric motor and the grasping device records the peak torque that has been applied during the loosening of the threaded cap.

In a preferred embodiment of the invention, the complete system is mounted on a relatively small base which may readily be positioned on a conventional laboratory table top. The base is provided with means for holding a container in a fixed position thereon. An electric motor is mounted on means for guiding the reciprocation of the electric motor in a vertical plane with the longitudinal axis of the motor in alignment with the longitudinal axis of the container. The electric motor is provided with an acceleration control so that the electrical force being supplied to the electrical motor is gradually increased to generate the torque necessary to start and continue the loosening of the threaded cap. A torque sensor is coupled to the shaft of the electric motor and a threaded cap grasping means is coupled to the torque sensor. A constant force in a longitudinal direction is placed on the threaded cap. The electric motor, the means for mounting the electric motor, the torque sensor and the grasping means are secured to one end of a cable which cable is passed over a pulley and a counter-weight is secured to the other end of the cable. The counter-weight is selected to be a weight less than the weight of the electric motor, the means for mounting the electric motor, the torque sensor and the grasping means in an amount equal to the constant force that is desired to be placed on the threaded cap. The grasping means is a unitary device having no moving parts but is capable of grasping different sizes of threaded caps.

In operation, a container is placed in the holder and the apparatus is allowed to move downwardly into contact with the threaded cap. A gradually increasing electrical force is applied to the electric motor so that a gradually increasing torque is applied to the threaded cap. In some instances, the peak torque encountered in the loosening of a threaded cap occurs after the threaded cap has started to loosen. The torque sensor used in this invention measures and records the peak torque that has been applied to the threaded cap so that after the threaded cap has been completely loosened, there is a record of the peak torque that was applied to loosen the threaded cap.

It is an object of this invention to provide a system for determining the torque required to loosen a threaded cap on a container that is relatively simple and economical but produces accurate measurements.

It is a further object of this invention to provide such a system which includes making such measurements while a constant force is being applied to the container.

Additional objects, advantages, and novel features of the invention are set forth in part in the description which follows which will be understood by those skilled in the art upon examination of the following or may be learned by practice of the invention. The objects and advantages of the invention may be realized and obtained by means of the instrumentalities and combinations particularly pointed out in the appended claims.

BRIEF DESCRIPTION OF THE DRAWING

FIG. 1 is a front elevational view of one embodiment of this invention;

FIG. 2 is a top plan view of the means for holding the container;

FIG. 3 is a side elevational view of the system when being calibrated;

FIG. 4 is a cross-sectional view taken on the line 4—4 of FIG. 5;

FIG. 5 is a bottom plan view of the grasping means; and

FIG. 6 is an enlarged view in cross-section illustrating the knock out button.

DETAILED DESCRIPTION OF THE INVENTION

The apparatus 2 illustrated in FIG. 1 comprises a base 4 having feet 6 at each corner thereof for supporting the base on a laboratory table top (not shown). A holder 8 is secured to the base 4 by blocks 10. The holder 8, as illustrated in FIG. 2, has a surface 12 formed of a friction material, such as rubber, and has a plurality of upstanding posts 14 which are covered by a friction material, such as rubber. The posts 14 are adjustably mounted to accommodate containers of different size. A recess 16 extends across the holder 8 and a threaded rod 18 is mounted in the recess for rotation therein. A pair of arms 20 and 22 have bosses (not shown) extending downwardly therefrom which are threadedly engaged with the threaded rod 18 so that rotation of the threaded rod 18 moves the arms in the directions indicated by the arrow 24. A knob 26 is secured to the rod 18 to facilitate the turning of the rod. A plurality of spaced apart openings 28 are provided in the arms 20 and 22 which openings are dimensioned so that the posts 14 may be removably positioned therein. This permits changing of the spacing between the post 14 in the directions indicated by the arrow 30.

A pair of upstanding, spaced apart, vertical, parallel guide rods 32 and 34 are securely mounted in a fixed location on the base 4. A rod 36 is secured in openings 38 and 40 adjacent the ends of the guide rods 32 and 34. A bearing 42 is secured to the rod 36 and a pulley 44 having a groove 46 is mounted on the bearing 42 so that the pulley 44 may rotate relative to the rod 36 for a purpose described below.

A mounting platform 48 is provided with bushings 50 and 52. The guide rods 32 and 34 extend through the bushings 50 and 52 so that the mounting platform 48 may be readily moved over the guide rods 32 and 34. Movement of the mounting platform in the upward direction is limited by the shaft collar 54 and in the downward direction by the shaft collar 56, each of which are adjustably secured to the guide rod 34 by set screws 58 and 60. A knob 62 is secured to the mounting platform so that it may be conveniently grasped whenever it is desired to move the mounting platform 48 over the guide rods 32 and 34.

An electric motor 64 is mounted in a fixed location on the mounting platform 48. The shaft 66 of the electric motor extends through an opening in the mounting platform. A coupling 68 connects the shaft 66 of the motor 64 to the shaft 70 of a torque sensor 72. A socket comprising a hollow, cup shaped device 74 is secured to the torque sensor 72. As illustrated in FIGS. 4 and 5, the hollow, cup shaped device 74 has a top 76 having an opening 78 for receiving the shaft 80 of the torque sensor 72. The opening 78 and the shaft 80 each have a square cross-sectional configuration so as to prevent relative rotational movement therebetween. Suitable means, such as a set screw (not shown), may be used to retain the hollow, cup shaped device on the shaft 80. The inner surface 82 of the hollow, cup shaped device 74 is inclined with the largest open cross-sectional configuration being closest to the open end 84 thereof. The inner surface 82 comprises a plurality of flutes 86 so as to form a plurality of inclined edges 88. When the hollow, cup shaped device 74 is placed over a threaded cap on a container, the edges 88 will be located between serrations on the threaded cap so as to prevent relative rotation between the hollow, cup shaped device 74 and the threaded cap. An opening 90 extends into the side wall 92 of the hollow, cup shaped device 74 and is dimensioned to receive one end of a calibration bar 94 for a purpose described below.

As illustrated in FIG. 6, the hollow, cup shaped device 74 is provided with means 96 for knocking out any cap remaining in the hollow, cup shaped device 74 after a measurement has been made. The means 96 comprises a passageway 98 formed in the side wall 96 and opening into at least one of the flutes 86. A button 100 is mounted for sliding movement in the passageway 98. A rod 102 is positioned in the hollow, cup shaped device 74 so as to pass through a slot 104 in the button 100 so as to limit movement of the button 100 into and out of the passageway 98. A spring 106 urges the button 100 in a radially outward direction.

Means 108 are provided for placing a constant amount of force on the threaded cap by the hollow, cup shaped device 74. Such means 108 comprises a cable 110 having a portion thereof seated in the groove 46 of the pulley 44. One end 112 of the cable 110 is secured to the mounting platform 48. The other end 114 of the cable 110 is secured to a weight 116. In accordance with the invention, the weight of the weight 116 is less than the combined weights of the mounting platform 48 and all the elements associated therewith or mounted thereon in an amount equal to the desired constant force to be placed on the threaded cap by the hollow, cup shaped device 74. In the preferred embodiment of the invention, this is between about 2 to 5 pounds and most preferably about 2 pounds.

A strain gauge conditioner indicator 118 is mounted on the base 4 and is connected to and operated by the torque sensor 72 in a conventional manner. A dial 120, having a peak read-out hold, records the peak torque that has been applied during the complete loosening of the threaded cap, as described below.

In FIG. 3, there is illustrated a system for calibrating the torque sensor 72 and the strain gauge conditioner and indicator 118. A pulley 122 is rotatably mounted on a collar 124 which is adjustably secured to the guide rod 32 by suitable means, such as the set screw 125. The pulley 122 has a groove similar to the groove 46 of the pulley 44. The mounting platform 48 is moved downwardly until it is in contact with the collar 56 so as to position the hollow, cup shaped device 74 at a location indicated by the dotted outline. A calibration bar 94 is inserted into the opening 90. A cable 126 has a portion thereof located in the groove of the pulley 122. One end 128 of the cable 126 is secured to the mid-point of the calibration bar 94. The other end 130 of the cable 126 is secured to a weight 132. Under operating conditions, as described below, the section of the cable between the pulley 122 and the calibration bar 94 lies substantially in a horizontal plane.

An operator protection enclosure 134 is mounted on the base 4 and comprises four posts 136 secured to base with sheet metal panels on three sides thereof. A door 138 is rotatably mounted to one of the posts 136 by hinge 140 so that it may be moved between an open and a closed position. Magnetic means 142 and 144 are provided to hold the door 138 in a closed position.

Under normal non-operating conditions, the mounting platform 48 will be in its downward location with the bushing 52 in contact with the collar 56. When it is desired to conduct a series of tests, the apparatus 2 is calibrated. The various elements are arranged as described above in relation to FIG. 3. The weight 132 through the attachment illustrated in FIG. 3 will put a readily calculable force on the hollow, cup shaped device 74. The calculated force is then compared with the indication on the dial of the torque sensor and any required adjustments may be made. In some instances the electric motor may be used in the calibration. In those instances, an electrical force is applied to the electric motor 64 by suitable means, such as a foot pedal switch (not shown). In the preferred embodiment, the electric motor 64 is of the type that is provided with acceleration control means that will gradually increase the force being applied to turn the shaft 66. In the preferred embodiment of the invention, the acceleration control is set to accelerate from 0 to 16 RPM in five seconds so as to try to duplicate approximately the human removal of a threaded cap. When the force being applied by the electric motor 64 is sufficient to overcome the deadweight applied by the weight 132, the electric motor 64 will start to turn. During the application of the increasing electrical force, the torque sensor 72 transmits signals to the strain gauge conditioner indicator 118 so that the peak torque applied to the electric motor is indicated on the dial 120 before the electric motor starts to turn. The indication on the dial 120 is compared with the known torque being applied by the deadweight and the dial 120 may be adjusted as required.

In using the apparatus to determine the torque required to loosen a threaded cap on a container, the door 138 is opened and the posts 14 are placed in the proper openings. The operator grasps the knob 62 and moves the mounting platform upwardly. A container 144 having a threaded cap 146 thereon is placed in the holder 8 and the knob 26 is rotated so that the container 144 is firmly grasped by the posts 14. The mounting platform is moved downwardly until the hollow, cup shaped device 74 is in contact with the threaded cap 146 with the edges 88 located between adjacent serrations on the threaded cap 146. The means 108 puts a constant downwardly directed force on the threaded cap 146. The door 138 is closed. The operator applies an electrical force to the electric motor by suitable means, such as a foot pedal (not shown). The amount of the electrical force is gradually increased so as to gradually increase the torque being applied to the threaded cap. When the operator observes that the threaded cap has been loosened, the operator ceases the application of the electric force. During the application of the increasing amounts of torque to the threaded cap, the torque sensor 72 transmits signals to the strain gauge conditioner indicator 118 so that the peak torque applied to loosen the threaded cap 146 is indicated on the dial 120.

It is contemplated that the inventive concepts herein described may be variously otherwise embodied and it is intended that the appended claims be construed to include alternative embodiments of the invention except insofar as limited by the prior art.

What is claimed is:

1. Apparatus for use in determining the torque required to loosen a threaded cap on a container comprising:

an electric motor having a longitudinal axis;
   means for mounting said electric motor so that its longitudinal axis lies in a vertical plane;
   means for supporting a container having a longitudinal axis at a fixed location with said longitudinal axis of said container substantially in alignment with said longitudinal axis of said electric motor;
   a drive shaft on said electric motor and having a longitudinal axis aligned with said longitudinal axis of said electric motor;
   means connected to said drive shaft for grasping a threaded cap on said container to prevent relative rotation between said threaded cap and said drive shaft;
   means for permitting movement of said electric motor in said vertical plane to move said grasping means into contact with said threaded cap;
   means for applying a constant force in a longitudinal direction on said threaded cap;
   means for applying an electrical force to said electric motor tending to turn said drive shaft so as to apply a torque on said threaded cap;
   means for gradually increasing the amount of said electrical force being applied to said electric motor to loosen said threaded cap; and
   means for measuring the amount of torque being applied by said electric motor on said threaded cap and for recording the peak torque that has been applied by said electric motor during the loosening of said threaded cap.

2. Apparatus as in claim 1 wherein said means for measuring the amount of torque being applied by said electric motor comprises:
   a torque sensor;
   means connecting said torque sensor to said drive shaft; and
   means connecting said torque sensor to said means for grasping said threaded cap.

3. Apparatus as in claim 2 wherein:
   said constant force in a longitudinal direction is in the range of 2 to 5 pounds.

4. Apparatus as in claim 2 wherein said means for grasping said threaded cap comprises:
   a hollow cup shaped device having an inclined inner surface with the largest inner diameter of said inclined inner surface being adjacent the open end of said hollow cup shaped device; and
   said inclined inner surface comprising a plurality of adjacent flutes.

5. Apparatus as in claim 4 and further comprising:
   an opening in the side wall of said hollow cup shaped device; and
   means for discharging a threaded cap located in said hollow cup shaped device.

6. Apparatus as in claim 5 wherein said means for discharging a threaded cap comprises:
   a button mounted for movement in said opening;
   means for biasing said button in a radial direction away from said hollow cup shaped device; and
   means for limiting the inward and outward movement of said button.

7. Apparatus as in claim 2 wherein said means for applying a constant force in a longitudinal direction on said threaded cap comprises:
   a rotatable pulley having a groove;
   a cable having a portion thereof located in said groove;
   one end of said cable secured to means including said means for mounting said electric motor;
   the other end of said cable secured to a weight;
   said weight having a weight less than the weight of said means mounting said electric motor, said electric motor, said torque sensor, said grasping means and any other associated elements; and wherein
   said means for mounting said electric motor for reciprocation in a vertical plane comprises:
   a base;
   a pair of spaced apart vertically extending guide rails secured to said base;
   a platform;
   means for mounting said platform for movement over said guide rails;
   means for mounting said electric motor on one side of said platform so that the drive shaft of said electric motor projects from the other side of said platform; and wherein said means for mounting said platform for movement over said guide rails comprises:
a pair of bushings mounted on said platform;
each of said guide rails passing through one of said bushings; and
said means for grasping said threaded cap comprises:
a hollow cup shaped device having an inclined inner surface with the largest inner diameter of said inclined inner surface being adjacent the open end of said hollow cup shaped device; and
said inclined inner surface comprising a plurality of adjacent flutes.

8. Apparatus as in claim 7 and further comprising:
means for limiting said movement of said platform over said guide rails in each direction.

9. Apparatus as in claim 8 and further comprising:
an opening in the side wall of said hollow cup shaped device; and
means for discharging a threaded cap located in said hollow cup shaped device comprising:
a button mounted for movement in said opening;
means for biasing said button in a radial direction away from said hollow cup shaped device; and
means for limiting the inward and outward movement of said button.

10. Apparatus as in claim 2 and further comprising:
deadweight means for use in calibrating said torque sensor when no container is present in the apparatus.

11. Apparatus as in claim 10 wherein said deadweight means comprises:
means for stopping the downward movement of said means for grasping said threaded cap at a predetermined position;
a calibration bar supported by said means for grasping said threaded cap;
means for supporting a grooved pulley so that the top portion of said groove is on a horizontal plane with the center portion of said calibration bar;
a cable having a portion thereof located in said groove;
one end of said cable attached to said calibration bar; and
the other end of said cable attached to a known weight.

12. Apparatus as in claim 1 wherein said means for applying a constant force in a longitudinal direction on said threaded cap comprises:
a rotatable pulley having a groove;
a cable having a portion thereof located in said groove;
one end of said cable secured to means including said means for mounting said electric motor;
the other end of said cable secured to a weight; and
said weight having a weight less than the weight of said means means mounting said electric motor, said electric motor, said torque sensor, said grasping means and any other associated elements.

13. Apparatus as in claim 1 wherein said means for mounting said electric motor and for permitting movement thereof in a vertical plane comprises:
a base;
a pair of spaced apart vertically extending guide rails secured to said base;
a platform;
means for mounting said platform for movement over said guide rails; and
means for mounting said electric motor on one side of said platform so that said drive shaft projects from the other side of said platform.

14. Apparatus as in claim 13 wherein said means for mounting said platform for movement over said guide rails comprises:
a pair of bushings mounted on said platform; and
each of said guide rails passing through one of said bushings.

15. Apparatus as in claim 14 and further comprising:
means for limiting said movement of said platform over said guide rails in each direction.

16. Method for use in determining the torque required to loosen a threaded cap on a container comprising:
mounting an electric motor for reciprocation in a vertical plane;
supporting a container having a threaded cap thereon at a fixed location so that the longitudinal axis of said container is substantially aligned with the longitudinal axis of said electric motor;
grasping said threaded cap with means associated and rotatable with the drive shaft of said electric motor so as to prevent relative rotational movement between said threaded cap and said drive shaft;
moving said electric motor in said vertical plane until said threaded cap has been grasped;
applying a constant downward longitudinally directed force on said threaded cap;
applying an electrical force to said electric motor tending to turn said drive shaft so as to apply a torque on said threaded cap;
gradually increasing the amount of electrical force being applied to said electric motor; and
measuring the amount of torque being applied by said electric motor on said threaded cap and recording on a gauge the peak torque that was applied during the complete loosening of said threaded cap.

17. Method as in claim 16 and further comprising:
using a torque sensor to measure said amount of torque being applied by said electric motor.

18. Method as in claim 16 wherein said application of a constant downward longitudinally directed force on said threaded cap comprises:
mounting a cable for movement over a fixed pulley;
securing said electric motor, said mounting for said electric motor, said grasping means and said torque sensor on one end of said cable;
securing a weight to the other end of said cable; and
selecting said weight to have a weight less than the weight of said electric motor, said mounting for said electric motor; said grasping means and said torque sensor of between 2 to 5 pounds.

19. Method as in claim 18 and further comprising:
calibrating said torque sensor while attached to said electric motor and said grasping means using a deadweight system with no container present.

20. Method as in claim 19 wherein said deadweight system comprises:
securing a calibration bar to said grasping means;
mounting a cable for movement over a fixed pulley;
stopping the downward movement of said grasping means so that the top of said pulley and the center of said calibration bar are in the same horizontal plane;
securing one end of said cable to said calibration bar;
securing the other end of said cable to a known calibration weight; and
comparing the amount of torque indicated by said gauge with said known calibration weight.

* * * * *